3,345,174
RAPID ACCESS PHOTOGRAPHIC PROCESS
Charles R. Dotson, Litchfield Park, and Harold M. Campbell, Phoenix, Ariz., assignors, by mesne assignments, to the United States of America as represented by the Secretary of the Air Force
No Drawing. Filed Aug. 2, 1965, Ser. No. 476,765
1 Claim. (Cl. 96—61)

This invention concerns photography and more particularly provides a silver halide photographic film processing method which achieves quick access, high speed and excellent quality in the optical reproduction of objects photographed.

Past practices in the field of photography in which the present invention resides, illustratively are disclosed in the issued Patents No. 3,167,429 to Levy; No. 3,162,534 to Powers and Schwarz; and No. 2,614,927 to Broughton and Woodward.

The object of the present invention is to provide a new and useful photographic film processing method that is superior to comparable methods that have been practiced heretofore.

In the process that is described herein, one of the outstanding and novel procedural steps that characterizes this new process is the pretreating or the soaking with a first solution the film's emulsion prior to its exposure.

The process involves the sequential application to the film's emulsion of four solutions. The film's emulsion prior to its exposure has applied thereto by means of an applicator, such as those described in the Broughton and Woodward Patent 2,614,927, which applicator is saturated with the film emulsion soaking first solution that is described hereinafter.

The film emulsion soaking solution as Solution No. 1, is made by pouring into a container, such as a glass beaker, of 2 or 3 liters capacity, enough distilled water to minimize heating effects caused by reactants that are to be added thereto in the following quantities:

| | Milliliters |
|---|---|
| Concentrated sulphuric acid | 3 |
| Ethylene glycol | 10 |
| Formaldehyde | 10 | to which are added:

| | Grams |
|---|---|
| Sodium hexameta phosphate | 1 |
| Sodium sulfite | 15 |
| Sodium sulfate | 45 |
| Hydroquinone | 35 |
| Potassium bromide | 50 |
| Ascorbic acid | 1 |
| Hypo-sodium thiosulfate | 1 | to which is added sufficient water to make one liter of solution.

In the development of the film emulsion, after the film has been exposed, another applicator head is used and this second applicator head is saturated with a developer activator, solution No. 2. The developer activator, No. 2 solution, is made by adding to distilled water, in sufficient quantities to minimize thermal effects, the following reactants:

| | Grams |
|---|---|
| Sodium sulfite | 15 |
| Sodium hydroxide | 60 |
| Sodium sulfate | 50 |
| Potassium bromide | 1 | to which water is added in sufficient quantity to make 1 liter of solution.

The film emulsion so developed by the activator, i.e., the second solution, then has applied thereto by a third applicator head a fixer and stabilizer solution and termed herein the clearing solution. The fixer and stabilizer solution which is indicated as solution No. 3 is made by adding to a suitable quantity of water:

| | Milliliters |
|---|---|
| Ammonium thiocyanate of 40% strength | 600 |
| Sodium thiosulfate (concentrated solution) | 60 | to which sufficient distilled water is added to make up one liter of solution.

A rinse-wash solution No. 4 consists of 5% by weight of ammonium thiocyanate (NH$_4$SCN) in distilled water. The solution No. 4 is caused to saturate a fourth applicator head, and as a fourth step in the process is caused to be applied by the applicator head to the film's emulsion. This fourth rinse and wash solution serves to prevent tackiness and precipitation in the film's emulsion.

The photographic film processing method which is described herein achieves quick access, high speed and excellent quality to the film's emulsion that has been so treated. Limited modifications may be made in the four solutions that are described herein and in the manner of their application to the film's emulsion, without departing from the spirit and the scope of the present invention.

We claim:

The process of pretreating a silver halide photographic film's emulsion prior to its exposure with a first solution that contains: 3 milliliters of concentrated sulphuric acid, 10 milliliters of ethylene glycol, 10 milliliters of formaldehyde to which are added 1 gram of sodium hexameta phosphate, 15 grams of sodium sulfite, 45 grams of sodium sulfate, 35 grams of hydroquinone, 50 grams of potassium bromide, 1 gram of ascorbic acid and 1 gram of sodium thiosulfate in sufficient water to make one liter of solution; exposing the film; applying to the film a developer activator second solution containing 15 grams of sodium sulfite, 60 grams sodium hydroxide, 50 grams sodium sulfate, 1 gram of potassium bromide in a sufficient quantity of water to make up one liter of said second solution; applying a clearing third solution to said developed and activated emulsion containing 600 milliliters of ammonium thiocyanate of 40% strength, 60 milliliters of concentrated sodium thiosulfate solution and sufficient distilled water to make up one liter of said clearing solution; and rinse-washing said emulsion with a fourth solution containing five percent by weight of ammonium thiocyanate in distilled water preparatory to drying the film.

References Cited

UNITED STATES PATENTS

| 2,126,349 | 8/1938 | Salo | 96—61 |
|---|---|---|---|
| 2,541,470 | 2/1951 | Henn et al. | 96—66 |
| 2,614,927 | 10/1952 | Broughton et al. | 96—61 |
| 3,162,534 | 12/1964 | Powers et al. | 96—63 |
| 3,178,282 | 4/1965 | Luckey et al. | 96—66 |
| 3,212,895 | 10/1965 | Barbier et al. | 96—95 |

FOREIGN PATENTS 1,329,588  5/1963  France.

NORMAN G. TORCHIN, Primary Examiner.

J. TRAVIS BROWN, Examiner.

C. E. DAVIS, Assistant Examiner.